May 5, 1964 J. GALEJS 3,132,340
FREQUENCY MODULATION DISTANCE INDICATOR
Filed May 21, 1958 6 Sheets-Sheet 1
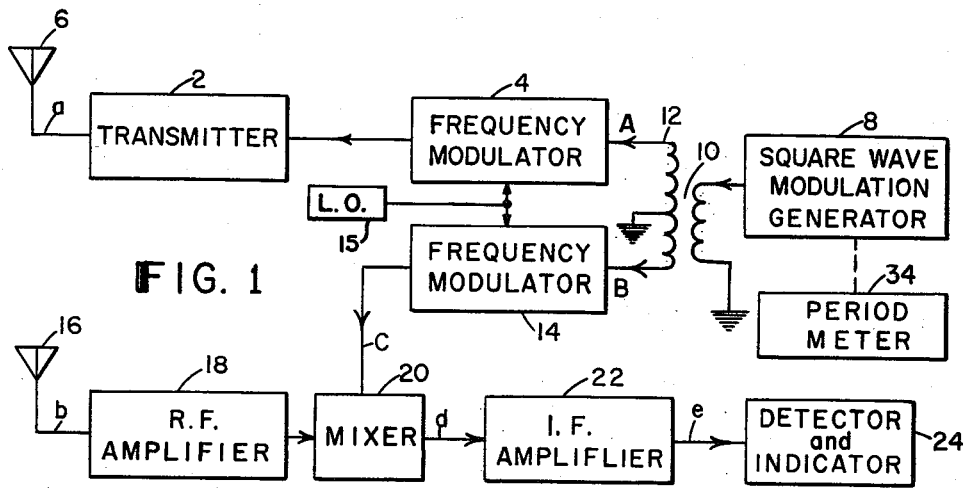
FIG. 1
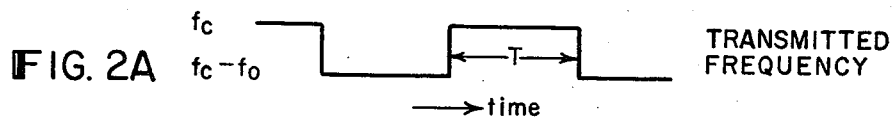
FIG. 2A — TRANSMITTED FREQUENCY
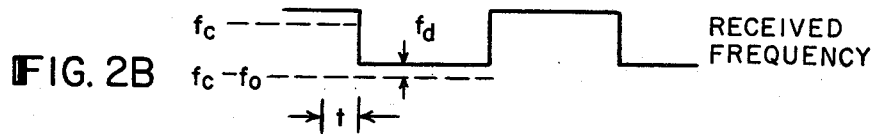
FIG. 2B — RECEIVED FREQUENCY
FIG. 2C — LOCAL OSCILLATOR
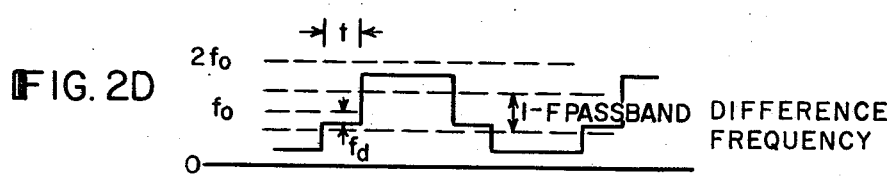
FIG. 2D — DIFFERENCE FREQUENCY
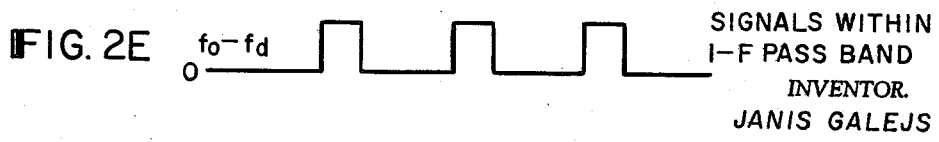
FIG. 2E — SIGNALS WITHIN I-F PASS BAND
INVENTOR.
JANIS GALEJS
BY
*Spencer E. Olson*
ATTORNEY.

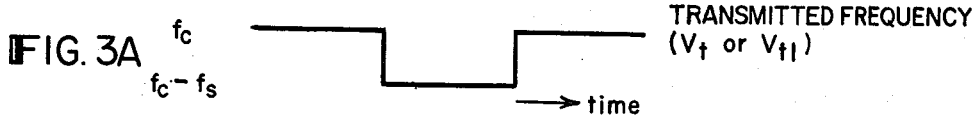
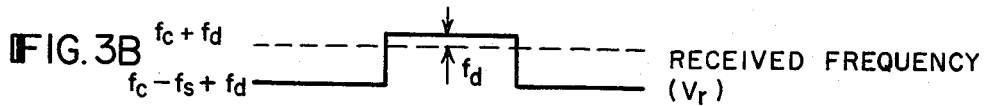
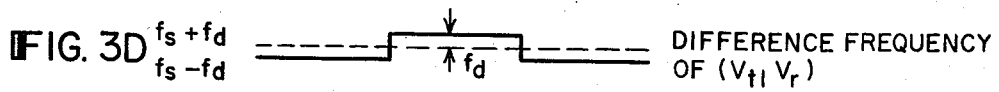
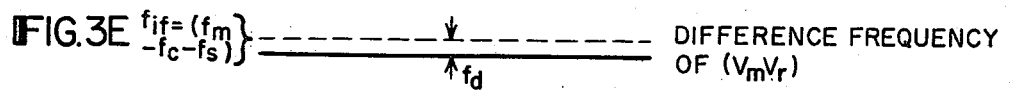
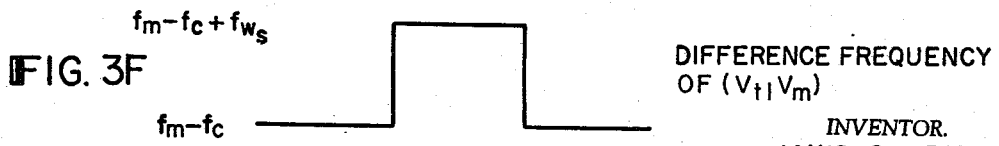

May 5, 1964 J. GALEJS 3,132,340
FREQUENCY MODULATION DISTANCE INDICATOR
Filed May 21, 1958 6 Sheets-Sheet 3

INVENTOR.
JANIS GALEJS
BY
ATTORNEY.

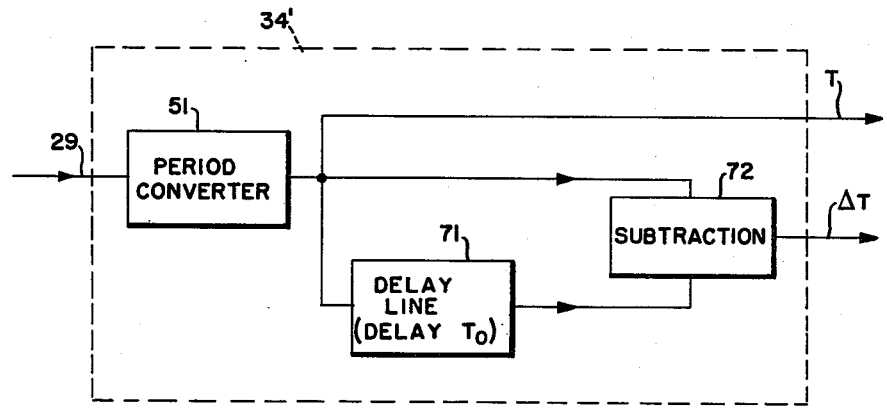
FIG. 4b
FIG. 4c
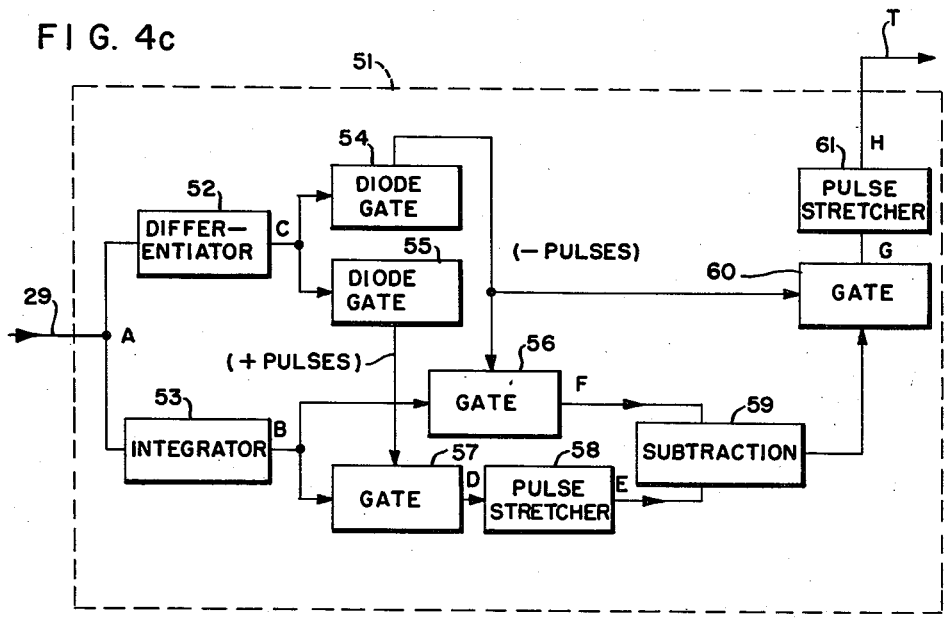

May 5, 1964    J. GALEJS    3,132,340
FREQUENCY MODULATION DISTANCE INDICATOR
Filed May 21, 1958    6 Sheets-Sheet 5
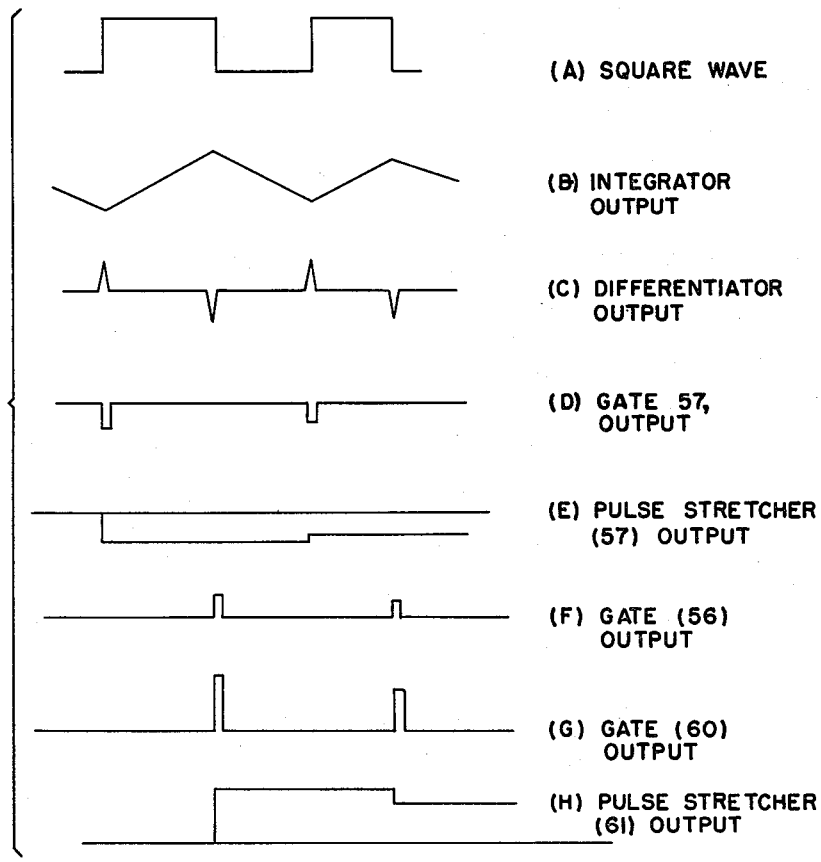
FIG. 4d
- (A) SQUARE WAVE
- (B) INTEGRATOR OUTPUT
- (C) DIFFERENTIATOR OUTPUT
- (D) GATE 57, OUTPUT
- (E) PULSE STRETCHER (57) OUTPUT
- (F) GATE (56) OUTPUT
- (G) GATE (60) OUTPUT
- (H) PULSE STRETCHER (61) OUTPUT
FIG. 4e
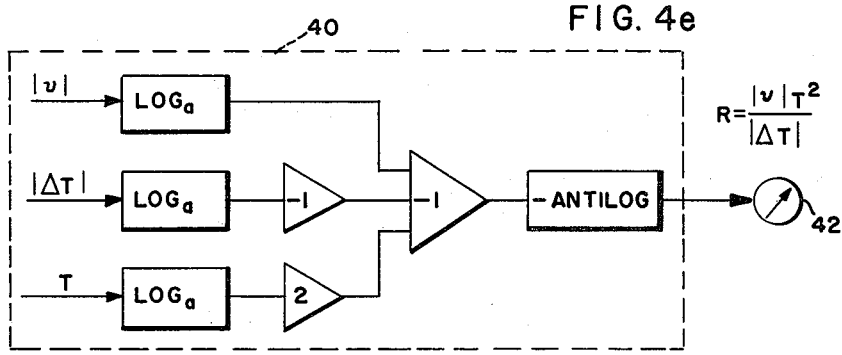
$$R = \frac{|v|T^2}{|\Delta T|}$$
INVENTOR
JANIS GALEJS
BY Spencer E. Olson
ATTORNEY May 5, 1964　　　　J. GALEJS　　　　3,132,340
FREQUENCY MODULATION DISTANCE INDICATOR
Filed May 21, 1958　　　　　　　　　　　　　　6 Sheets-Sheet 6
TRANSMITTED
FREQUENCY
→ time
FIG. 5A　　　　　　　　　　　FIG. 6A
RECEIVED
FREQUENCY
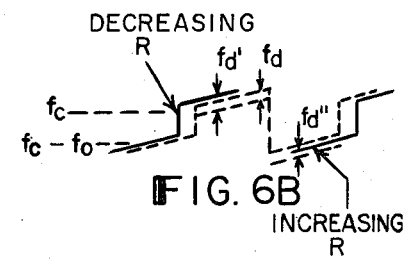
FIG. 5B　　　　　　　　　　　FIG. 6B
LOCAL
OSCILLATOR
FIG. 5C　　　　　　　　　　　FIG. 6C
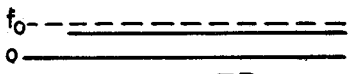
SIGNALS
WITHIN I-F
BAND
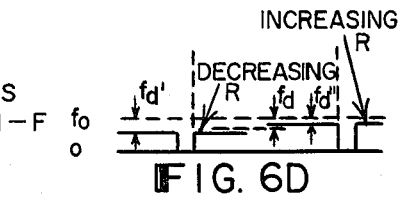
FIG. 5D　　　　　　　　　　　FIG. 6D
$f_d$: TRUE DOPPLER SHIFT.
$f_d'$: APPARENT DOPPLER SHIFT
　　　− DECREASING RANGE.
$f_d''$: APPARENT DOPPLER SHIFT
　　　− INCREASING RANGE.
*INVENTOR.*
JANIS GALEJS
BY
*ATTORNEY*

United States Patent Office 3,132,340
Patented May 5, 1964

3,132,340
FREQUENCY MODULATION DISTANCE INDICATOR
Janis Galejs, Arlington, Mass., assignor, by mesne assignments, to Sylvania Electric Products Inc., Wilmington, Del., a corporation of Delaware
Filed May 21, 1958, Ser. No. 736,918
7 Claims. (Cl. 343—14)

This invention relates to distance measuring devices such as altimeters for radars, and more particularly to improvements in systems which operate by reflection of frequency modulated signals.

Frequency modulation altimeters and radars are well known, being described, for example, in Bently Pat. 2,011,302 and in Espenschied Pat. 2,045,071. In these systems a frequency modulated signal is radiated to the surface or object whose distance is to be measured. In a receiver located near the point of radiation, the reflected signal is picked up and mixed or heterodyned with some of the frequency modulated signal received directly from the transmitter. The average frequency of the resulting beat signal is determined by the time required for the radiated signal to reach the reflecting object and return to the receiver, and is directly proportional to the distance. The beat signal is applied to a frequency responsive indicator, calibrated in units of distance, and may include a cycle counter circuit and a direct current meter, or a frequency responsive servo system.

Heretofore, systems of this type have employed a variety of types of frequency modulation, including triangular, sine wave, and square-wave modulation. Each of these systems, however, is susceptible to transmitter-receiver signal leakage which often restricts the applicability of such systems. Separate receiving and transmitting antennas are usually required in order to achieve sufficient isolation between the transmitting and receiving sections of the system. Spurious modulations of the transmitter leakage signal affect the accuracy of the radar, and some systems employing this type of modulation are susceptible even to unmodulated leakage. Balancing out the leakage signal in the I-F output, as proposed by Ismail in an article entitled "A Precise New System of FM Radar" appearing in Proc. of the I.R.E., vol. 45, No. 5, pages 695 to 696; May 1957, is feasible only if the leakage is of the same order of magnitude as the received signal. Moreover, the application of triangular and sine wave modulation is, in general, restricted to short range, large area targets.

Frequency modulation ranging systems which employ variable frequency sinusoidal modulation are also known. In this type of system, the modulation frequency is adjusted so that the delay time of the transmission is equal to an integral multiple of the modulation period. The beat signal between the transmitted and the received wave is a continuous signal of Doppler frequency for the desired target; the leakage signal results in a zero frequency beat; and targets at different ranges cause only short bursts of the Doppler frequency. The signal leakage problems inherent in this system are similar to those which exist in single-frequency CW radars.

Finally, in known systems employing square-wave frequency modulation, the frequency of transmission shifts abruptly between two frequencies, the difference of which constitutes the intermediate frequency. The sum of the received signal and the transmitter-to-receiver-leakage signal is applied to the mixer. The modulation period can be adjusted with varying range, and a continuous I-F target return signal is obtained when the transmission delay time is equal to an odd multiple of the modulation half-period. The signal reflected from nearby objects, when beat with the direct leakage from the transmitter, results in a beat frequency which is not accepted by the I-F amplifier. The square-wave modulation thus avoids one of the shortcomings of triangular or sinusoidal modulation. However, the Doppler shifts of the received signal alternate in sign, there being a positive Doppler shift during one-half cycle of the modulation, and a negative shift during the other half-cycle. Thus, the system cannot discriminate between approaching and receding targets, and in addition, does not yield a CW Doppler-frequency signal, which is desirable for good speed discrimination. The bi-polar Doppler shift limits the use of an I-F Doppler-frequency filter to one-half cycle of the transmission period. The system is therefore a direct equivalent of a single-frequency pulsed system, where the frequency $f_c$ is transmitted for one-half cycle and the local-oscillator frequency $(f_c - f_0)$ is generated for the other half cycle, or vice versa.

It is a primary object of the present invention to provide a frequency modulation distance measuring system employing square-wave modulation which eliminates the disadvantages of known systems using this type of modulation.

Another object of the invention is to provide a frequency modulation distance measuring system in which there is substantial isolation between the transmitter and receiver.

Another object of the invention is to provide a system of the type described in which interference from short-path reflections is eliminated.

Another object of the invention is to provide a frequency modulation distance measuring system capable of tracking a target with discrimination in range and velocity.

These and other objects are attained in accordance with the present invention by mixing the received signal with a square-wave frequency modulated local oscillator signal, instead of with a signal from the transmitter as in previous systems. The local oscillator signal is frequency modulated in synchronism with the transmitted signal, but the frequency steps of the local oscillator signal are opposite to the frequency steps of the transmitted signals. In one of several possible arrangements, the frequency of the local oscillator signal is always either equal to that of the transmitted signal or higher than the frequency of the transmitted signal by twice the intermediate frequency. The local oscillator signal is mixed with the received signal to yield a difference frequency signal including three discrete difference frequencies, one of which is near the selected intermediate frequency while the other frequencies are considerably higher and lower than this intermediate frequency. This difference frequency signal is applied to an intermediate frequency amplifier whose pass band accepts only the former frequency whereby the output is a series of pulses occurring at twice the modulation repetition frequency, and which exhibit a unipolar Doppler shift during the full modulation cycle of the transmitter. The width of the I-F pulses change with variations in range between the radar and the target, or with changes in the modulation period, with attendant changes in the amplitude of the Doppler component of the target return. The discrete I-F pulses are spread into essentially a continuous wave with no phase discontinuities which is maximum when the time of transit of the signal to the target and return is equal to an odd multiple of the modulation half-period. Thus, as the modulation period is varied, maximum output occurs whenever $2R/c = (2n+1)T$, where R is the range to the target, c is the velocity of wave propagation, n is an integer, and T is the modulation half-period. The increments of successive modulation periods ΔT, required to maintain the target return at its maximum, is used to determine the target range R.

For tracking, where it is desirable to discriminate between targets of the same speed but at different ranges, a sawtooth frequency modulation is superimposed upon the rectangular frequency modulation of the transmitter and local oscillator.

Other objects, advantages and features of the invention will be evident from the following detailed description when read in connection with the accompanying drawings, in which:

FIG. 1 is a schematic block diagram of a frequency modulation distance measuring system embodying the present invention;

FIG. 2 is a graph showing the frequencies of signals transmitted and received in the operation of the system of FIG. 1;

FIG. 3 is a plot of wave forms of frequency versus time of input and output signals of the mixer of the system of FIG. 1;

FIG. 4b is a schematic block diagram of a portion of the circuit of FIG. 4;

FIG. 4c is a schematic block diagram illustrating suitable implementation of a portion of the circuit of FIG. 4b;

FIG. 4d is a series of waveforms useful in explaining the operation of the circuit of FIG. 4c;

FIG. 4e is a block diagram of a suitable computer in the circuit of FIG. 4.

FIG. 5 is a graph showing the frequencies of signals transmitted and received in the operation of the system of FIG. 4; and FIG. 6 is a graph showing the effect of range changes on the received and intermediate frequency signals in the system of FIG. 4 when the distance being measured is decreasing or increasing.

Figure 4:
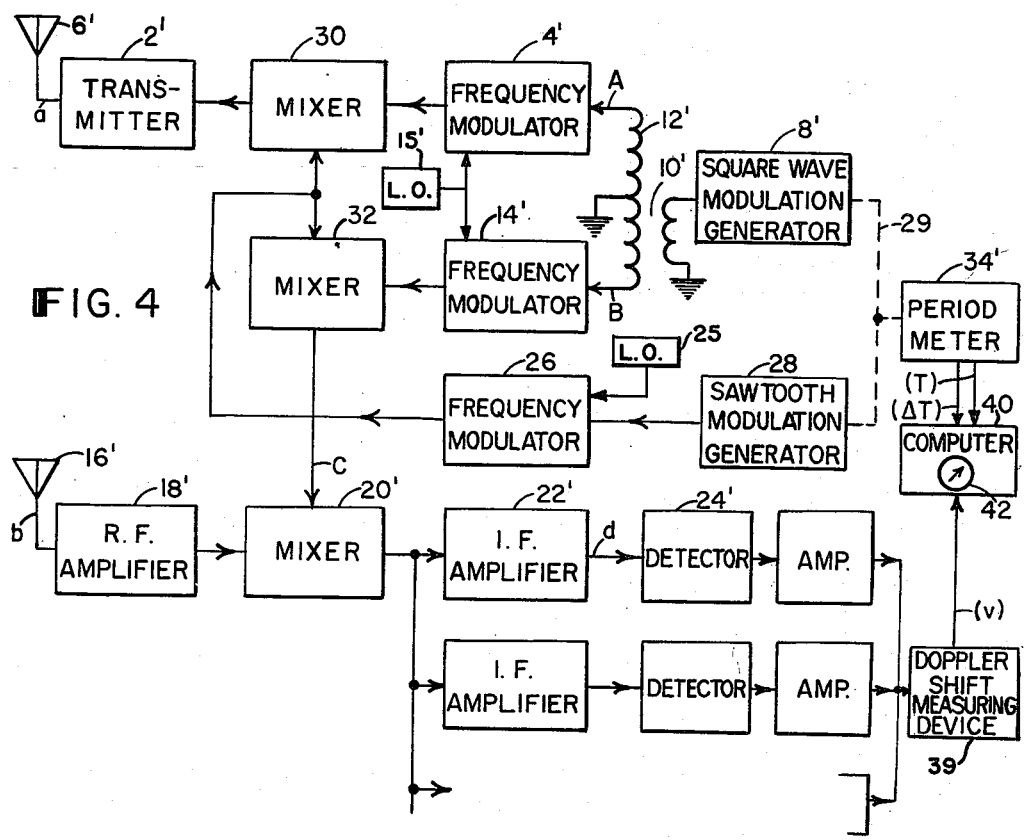
FIG. 4 is a schematic block diagram of a frequency modulation target tracking system embodying the invention.

Referring to FIG. 1, the present system, as in the prior art systems, includes a transmitter section and a receiver section. The transmitter section includes a transmitter 2 the output of which is frequency modulated by frequency modulator 4 and radiated by antenna 6. The modulator 4 may be of the type which varies the frequency in accordance with an applied voltage, such as an oscillator using a reactance tube circuit, the tuning signal being derived from square-wave modulation generator 8. Generator 8 is designed to produce a square waveform output which is coupled through transformer 10, the secondary 12 of which has a grounded center-tap. This coupling arrangement insures that the square-waveform output of generator 8 appears with opposite polarities at points A and B, the inputs to modulator 4 and to a second frequency modulator 14, respectively. A local oscillator signal is applied to modulators 4 and 14 from a local oscillator 15. Modulator 14 may be of the same type as modulator 4, namely, of a type which varies frequency in accordance with an applied voltage.

Referring to FIGS. 2a and 2c, modulation generator 8, transformer 10, local oscillator 15 and modulators 4 and 14 cooperate to produce at point a, that is, on the antenna, a square-wave frequency modulated signal of half-period T, and at point c a frequency modulated local oscillator signal, in which the frequency steps are opposite to the frequency steps of the transmitted signals. The transmitted frequency is abruptly varied in accordance with the square-wave pattern between an upper frequency, $f_c$ and a lower frequency $f_c - f_0$. The lower frequency of the local oscillator signal is the same as the upper frequency of the transmitted signal, namely $f_c$, and the upper frequency of the local oscillator is $f_c + f_0$.

The transmitted signal radiated by antenna 6 after reflection from the terrain or from a target is received on the receiving antenna 16 and applied to an R-F amplifier 18 preparatory to application to a mixer 20. FIG. 2b shows the variation of the instantaneous frequency of the signal received after reflection from the ground with respect to time. It will be noted that the reflected signal lags behind the transmitted signal by a finite time $t$, determined by the velocity of propagation and the distance to the reflecting object. The received frequency, indicated by the solid line, is also displaced vertically by Doppler shift, designated $f_d$. It will be obvious that the received signal lags behind the local oscillator signal by the same amount it lags the transmitted signal.

The local oscillator signal (FIG. 2c) from modulator 14 is mixed in the mixer 20 with the received signal (FIG. 2b) to yield the difference frequency signal represented by FIG. 2d. During the interval $t$ the difference frequency is $(f_c + f_0) - (f_c + f_d)$ or $f_0 - f_d$ as indicated on the graph. This same instantaneous difference frequency occurs again for another interval $t$ after elapse of a half period of the modulation cycle T. During the time of overlap of the "down pulse" of the received signal with the "up pulse" of the local oscillator signal, the difference frequency is $2f_0 - f_d$ as shown. During the time of overlap of the "up pulse" of the received signal with the "down pulse" of the local oscillator signal, the difference frequency is $f_d$ as shown.

The output of the mixer 20 is applied to intermediate frequency amplifier 22 having an I-F frequency $f_0$, and whose pass band excludes frequencies as high as $2f_0 - f_d$ and as low as $f_d$ for maximum values of $f_d$, but passes frequencies $f_0 \pm f_d$. Consequently, the output of the I-F amplifier is as depicted in FIG. 2e, namely a series of pulses occurring at twice the modulation repetition frequency, and which exhibit a unipolar Dopper shift during the full modulation cycle of the transmitter. It will be noted that the width of the I-F pulses will change with variations in range between the radar and the target, or with changes in the modulation period, thereby to change the amplitude of the Doppler component of the target return. When the intermediate frequency amplifier has the pass band characteristics described, and if the modulation frequency is adjusted so that the transmission delay time $t$ (FIG. 2b or 2d) is equal to an odd multiple of the modulation half-period T (there are no I-F pulses present when the transmission delay time is an integral multiple of the modulation period 2T) the difference frequency will always just equal the frequency $(f_0 - f_d)$ and a large output signal will result. Thus, as the modulation period is varied, maximum output occurs whenever $2R/c = (2n+1)T$, where $n$ is any integer and R is the distance to a target. Under these conditions, the discrete I-F pulses are spread into essentially a continuous wave with no phase discontinuities, and of maximum amplitude. Thus, if the modulation period is varied to maintain the average value of the pulsating current (FIG. 2e) at a maximum, indicating that the time required for the transmitted signal to travel out to the target and return is an odd multiple of the modulation half-period T, the increments of successive modulation periods required to maintain this maximum provides an approximate estimate of the target range. The signal output of I-F amplifier 22 is applied to a detector and indicator 24, which preferably includes an averaging circuit and direct current meter for indicating the presence of maximum target return, and a period meter 34 including a storage device for measuring the increments in the modulation half-period, $\Delta T$, necessary to maintain the maximum. Stated another way, the time interval $\Delta T$ is the change in successive modulation periods necessary to maintain target return at its maximum in accordance with the equation $$\frac{2R}{c} = (2n+1)T$$

As R changes with time because of target motion, so does T in order to satisfy this equation. If $R_1$ and $T_1$ are the target range and modulation periods, respectively, measured at time $t_1$, and $R_2$ and $T_2$ are the corresponding parameters at time $t_2$, then $$\Delta T = T_2 - T_1$$

$T_2$ and $T_1$ being the durations of successive modulation periods. This value of $\Delta T$, means for measurement of which will be described in connection with FIG. 4, gives a non-ambiguous target range R.

Considering again the curves FIGS. 2a, 2b and 2c, it will readily be seen that substantial isolation between the transmitter and receiver is accomplished by the present modulation technique. Mixing of the transmitted signal with the local oscillator signal yields either a zero frequency or a double I-F beat frequency, both of which are rejected by the I-F amplifier. With reference to FIG. 3, the isolation between the transmitter and the receiver may be even further improved by making the frequency steps of the transmitter and of the local oscillator signals ($f_s$ in FIG. 3) to be different from the I-F center frequency. This assures that spurious mixer output components from mixer 20 of FIG. 1, such as the difference frequency between the leakage signal $V_{ti}$ and the received signal $V_r$ (FIG. 3d), or the difference frequency between the leakage signal $V_{ti}$ and the local oscillator signal $V_m$ (FIG. 3f) lie outside the I-F pass band. When the radar is operated as indicated in FIG. 3, the only detrimental effects which the transmitter leakage can cause is a power damage of the mixer.

During tracking, which is accomplished by adjusting the modulation period to keep the output at its maximum, it is desirable to be able to discriminate between targets traveling at the same speed but at different ranges, but this information is not available from the system of FIG. 1. However, this information can be obtained by superimposing a sawtooth frequency modulation upon the rectangular frequency modulation just described. A suitable system for accomplishing this is diagrammatically illustrated in FIG. 4. Like the system of FIG. 1, it includes a square-wave modulation generator 8' the output of which is coupled through transformer 10', having a center-tapped secondary 12', to the tuning controls of a pair of frequency modulators 4' and 14' to which local oscillator 15' is connected, and additionally includes another local oscillator 25 coupled to a frequency modulator 26 which is controlled by a sawtooth modulation generator 28. Modulation generator 28 causes the instantaneous frequency of the output of modulator 26 to increase linearly from a lower value to an upper value and to then decrease substantially instantaneously to the lower value. The period of the sawtooth is equal to that of the square-wave modulation generator and is repeated in synchronism therewith, the period being measurable together as indicated by dotted line 29. The outputs of frequency modulator 26 and frequency modulator 4' are mixed in a mixer 30 to produce an output of the wave form shown in FIG. 5a which is radiated from antenna 6'. Similarly, the output of frequency modulator 26 is mixed in a second mixer 32 to produce the local oscillator signal depicted in FIG. 5c, which has the same wave shape as the transmitted signal but of opposite frequency steps by reason of the center tapped transformer 10'.

Upon reflection of the transmitted signal from the target and reception by the receiver antenna 16', it is mixed with the local oscillator signal in mixer 20' as in the system of FIG. 1. It will be noted that there is no time delay indicated between the received frequency signal (FIG. 5b) and the transmitted signal (FIG. 5d) showing that the modulation period has been adjusted so that the transmission delay time is equal to an odd multiple of the modulation half-period. As previously described, in this situation the discrete I-F pulses are spread into essentially a continuous wave of frequency $f_0 - f_d$ as shown in FIG. 5d.

The target range can be determined during the tracking mode of the radar using either the square-wave or the square-wave plus sawtooth modulation waveforms. When tracking a moving target the modulation period 2T of the modulation waveforms is continuously adjusted to keep the target return as observed at the output of amplifier 22 or 22' at its maximum. The increments of successive modulation half-periods $\Delta T$ required to maintain the target return at its maximum may be used in conjunction with the measured target velocity, v, to calculate the target range, R, by the relation $$R \approx \frac{v}{\Delta T} T^2 \qquad \text{(Eq. 1)}$$

where R and T refer to the same time instants and where $\Delta T$ is constant for targets of constant velocity. This equation can be verified by considering the difference in distances traveled by radar waves which are received at time instants separated in time by one modulation half-period. The instant at which measurement is made is designated by $t_0$, and the time instants which correspond to preceding modulation half-periods are designated by $t_{-n}$; thus, $t_{-1} = t_0 - T(t_0)$. The distance traveled by the echo signal which is received at time $t_0$ is $$2R(t_0) = c[T(t_0) + T(t_{-1}) + \ldots + T(t_{-2n})] \qquad \text{(Eq. 2)}$$
$$= c(2n+1)T_{av}$$

where c is the velocity of wave propagation. The distance traveled by the echo received at $t_{-1}$ is $$2R(t_{-1}) = c[T(t_{-1}) + T(t_{-2}) + \ldots + T(t_{-2n-1})] \qquad \text{(Eq. 3)}$$

The difference between successive modulation half-periods is designated by $\Delta T (\Delta T = T(t_{-m}) - T(t_{-m-1}))$, $\Delta T$ being constant for targets of constant radial velocity. The difference between the two distances of Eqs. 2 and 3 is $$2[R(t_0) - R(t_{-1})] = c[T(t_0) - T(t_{-2n-1})]$$
$$= c(2n+1)\Delta T \qquad \text{(Eq. 4)}$$

The distance traveled by the target in the same time interval is $$R(t_0) - R(t_{-1}) = vT(t_0) \qquad \text{(Eq. 5)}$$

Multiplying Eq. 5 by 2 and subtracting from Eq. 4 gives $$c(2n+1)\Delta T = 2vT(t_0) \qquad \text{(Eq. 6)}$$

or $$\frac{c(2n+1)}{2} = \frac{vT(t_0)}{\Delta T}$$

Substituting Eq. 6 in Eq. 2 one obtains $$R(t_0) = \frac{vT(t_0)T_{av}}{\Delta T} \qquad \text{(Eq. 7)}$$

$T_{av}$ of Eq. 2 is related to $T(t_0)$ by the expression, $$T_{av} = T(t_{-n}) = T(t_0) - n\Delta T \qquad \text{(Eq. 8)}$$

From Eq. 6, $n\Delta T$ may be expressed as, $$n\Delta T = \frac{vT(t_0)}{c} - \frac{\Delta T}{2} \qquad \text{(Eq. 9)}$$

Substituting Eq. 9 into 8 and Eq. 8 into 7 it follows that $$R(t_0) = \frac{vT(t_0)}{\Delta T}\left[T(t_0) - \frac{vT(t_0)}{c} - \frac{\Delta T}{2}\right] \qquad \text{(Eq. 10)}$$

When the ratio of $v/c$ is much less than unity, and $\Delta T$ is much less than $T(t_0)$, which conditions obtain in the usual situation, the range R of Eq. 10 is approximated by Eq. 1.

As in the system of FIG. 1, a detector 24' which may include an averaging circuit and a direct current meter is provided to show when the target return is at its maximum, and a period meter 34' is provided for the measurement of the increments in the modulation half-period $\Delta T$ required to keep the return at its maximum. The period meter 34 may include a storage device which stores the period information over a prescribed interval of time $T_0$ to yield $2T(t-T_0)$, and a subtraction device arranged to provide an output $$2T(t)-2T(t-T_0)=K\Delta T$$

which is proportional to the increments $\Delta T$ in the modulation half-period T. FIG. 4b is a block diagram of a suitable circuit for measuring $\Delta T$, consisting of a period converter 51 for producing an input voltage proportional to the period T of the square wave applied over line 29 from modulation generator 8′. This signal is applied to a delay line 71 having the aforementioned prescribed delay $T_0$, with the original and the delayed signals applied to a subtraction circuit 72, the output of which is proportional to $\Delta T$ in the above equation.

The period converter 51 may take a variety of forms known to the art, a suitable circuit being shown in FIG. 4c, and the waveforms at various points in the circuit being shown in FIG. 4d. The square wave of modulation generator 8′ is applied in parallel to a differentiating circuit 52 and an integrating circuit 53, the outputs of which are respectively shown at B and C in FIG. 4d. The output of the differentiator is applied in parallel to a pair of diode polarity gates 54 and 55 which are connected to pass only negative and positive pulses, respectively. During the positive output pulse from gate 55 another gating circuit 57 is opened to pass the output of the integrator 53 to produce at its output the waveform shown at D. This signal is applied to a pulse stretching circuit 58 to produce a long pulse having an amplitude corresponding to the output of gate 57, as indicated at E. Similarly, during the negative pulses from diode gate 54 another gate 56 is opened to pass the integrator output occurring at that time, the output of gate 56 being shown at F. The latter signal and the output of pulse stretcher 58 are applied to a subtraction circuit 59 the output of which is applied to a gate 60 controlled by the negative pulses from gate 54. The amplitude of the pulses passing gate 60 (waveform G) is equal to the difference between the amplitude of pulses passed by gate 56 and the output of pulse stretcher 58 at the time of sampling. The signal passing gate 60 is applied to a pulse stretcher 61, the output of which (waveform H) is equal to the difference of the integrator output between the two sampling times, or equal to the integral of the input voltage over a half-period $T_0$ of the square wave. The integral of a constant amplitude signal being proportional to its duration, the output of pulse stretcher 61 is proportional to T. Referring again to FIG. 4b, this signal is derived as an output of the period meter 34′ and is also applied to the delay line 71 and subtraction circuit 72 to obtain a voltage proportional to $\Delta T$.

Figure 4A:
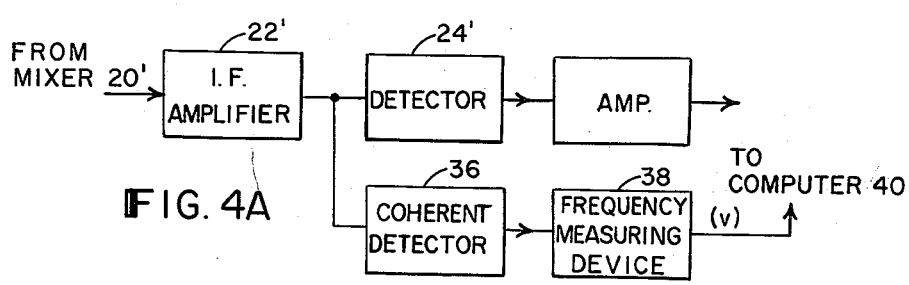
FIG. 4a is a schematic block diagram illustrating an alternate form of a portion of the system of FIG. 4.

The radial target velocity $v$ may be derived from the Doppler frequency shift which may be determined from the outputs of a bank of narrow band Doppler filters; for example, a plurality of parallel I-F amplifier-detector-amplifier combinations, two of which are illustrated in FIG. 4. The Doppler shift measuring device 39 compares the amplitudes of the several Doppler channels in a manner known to the art to provide an output proportional to the estimated Doppler shift. For example, the outputs of the plural Doppler channels may be applied to corresponding ones of a like plurality of threshold circuits arranged such that only the circuit of the channel exhibiting the largest signal amplitude produces at the output of device 39 a voltage proportional to the Doppler shift in that channel. Should the Doppler frequency lie nearly midway between the center frequencies of two adjacent Doppler channels, both channels may produce an output, the magnitude of which is intermediate between the voltages of the two channels. Alternatively, radial target velocity may be determined by the utilization of a coherent detector 36 coupled to the output of I-F amplifier 22′ and followed by a frequency measuring device 38, connected in parallel with detector 24-amplifier, as shown in FIG. 4a, which shows only a portion of the system of FIG. 4. Frequency measuring device 38 may take a variety of forms known to the art, its function being to produce an output voltage proportional to the output frequency of detector 36. For example, the requirements of this device are met by the basic computing and indicating portions of the speed measuring radar described on pages 271–278 of Luck, "Frequency Modulation Radar," McGraw-Hill, 1949. As another alternative, coherent detector 36 and its associated frequency measuring device may be replaced by an F-M limiter-discriminator combination, which provides an output voltage proportional to the frequency deviation from a preselected center frequency. The signals respectively proportional to T, $v$ and $\Delta T$ are applied to a simple computer 40 in which the range, R, is determined by solution of Eq. 1, and indicated on a suitable indicator 42. It will be noted that the computation for solving Eq. 1 requires multiplications and divisions involving the quantities $v$, $\Delta T$ and T. Since $(v/\Delta T)$ and T are both positive, a single quadrant multiplier, such as the logarithm multiplier illustrated in FIGURE 6.3 of Korn and Korn, "Electronic Analog Computers," McGraw-Hill, 1952, is satisfactory. This computer, modified slightly for the solution of the equation for R, is shown in FIG. 4e. After adding log $|v|$, $-\log |\Delta T|$, and 2 log T, the antilog provides the desired quantity R, which is derived as a voltage signal and may be read on voltmeter 42.

The curves of FIGS. 6a, 6b, 6c and 6d show the effect of range variations upon the Doppler component of the I-F signal. Targets of the same velocity relative to the radar (that is, producing the same Doppler shift $f_d$) can be resolved in range upon the basis of their apparent Doppler shift, $f_d'$ or $f_d''$, which differs from the true Doppler shift due to the combined effect of the range displacement and the sawtooth modulation. The degree of range resolution obtainable is a function of the Doppler filter band width and the slope of the saw-tooth frequency modulation. FIGS. 6b and 6d also illustrate the manner in which the sense of the change in apparent Doppler frequency due to a change in range indicates the direction of the range variation. That is, for decreasing range, the apparent Doppler shift is greater than the true Doppler shift, and for increasing range the apparent shift is less than the true Doppler shift. This effect gives rise to an error signal that may be used for correcting the modulation period 2T to maintain the output of the I-F amplifier 22′ at its maximum.

When a target is tracked by varying the modulation period T of generator 8′ and saw-tooth modulation generator 28, represented by the dotted line 29, in order to maintain the condition that $$\frac{2R}{c}=(2n+1)T$$

the modulation period 2T decreases for an approaching target and increases for a receding target. Since design considerations of the system such as realizable rise times in modulation circuits, the bandwidth of the frequency modulation, etc., may limit the range over which T may be varied, it may be necessary after one extreme value $T_1$ is reached during tracking to change the value of T to another extreme value $T_2$. The change must be made rapidly, and after an arbitrary new value of $T_2$ has been selected, the target motion can be relied upon to establish synchronism with the new repetition period $T_2$. It is also possible to compute the new repetition period $T_2$ such that synchronism is established instantaneously. This computation may be based on approximate range data, derived from the increments of successive modulation periods $\Delta T$ required to maintain the target return at its maximum, from which several equally probable values of $T_2$ may be obtained. Ratios of $T_2/T_1$ of approximately 2, or 0.5, give the least uncertainty in computing the exact value of $T_2$ at which synchronism will be established instantaneously.

The applicability and feasibility of the above-described radar system is dependent on its ability to reject clutter. From an analysis of clutter spectra it has been determined that discrimination between clutter and target returns is possible for high modulation repetition frequencies. Such clutter signals as fall within the I-F pass band are pulsed, and the spectrum is similar to the clutter spectrum encountered in prior art pulse-Doppler systems. When the modulation repetition frequencies are sufficiently high, the clutter spectrum does not fold over the Doppler component of the target return, and hence the Doppler component can effectively be used as a measure of range.

The invention has been described as an improved distance measuring system of the square-wave modulated frequency modulation type, wherein a separate local oscillator signal, modulated in frequency, the steps of which are opposite to the frequency steps of the transmitted signals, is generated. This feature, combined with a variable modulation repetition frequency during tracking and the superposition of square-wave and saw-tooth frequency modulation, provides a system possessing the following characteristics:

(1) High average power reception of the desired signal is attained, with low peak power transmission, as in a continuous wave system.

(2) Multi-plexing in frequency provides substantial isolation between the radar transmitter and receiver.

(3) Interference from short-path reflections, a major problem in continuous wave systems, is eliminated.

(4) Tracking can be accomplished with discrimination in range and in velocity, a characteristic lacking in a continuous wave Doppler system.

What is claimed is:

1. In a frequency modulation distance measuring system, means for transmitting radio waves frequency modulated in accordance with a first periodic signal changing abruptly between a first frequency and a second frequency, means adjacent to the transmitting means receiving said waves after a delay by reflection from an object, means for generating a local oscillator signal frequency modulated in accordance with a second periodic signal of the same form but opposite in phase to said first signal, means for mixing the received waves with said local oscillator signal to produce a resultant signal containing difference frequencies, means for amplifying selected ones of said difference frequencies, means for varying the period of said first and second periodic signals to maintain the amplitude of said selected ones of said difference frequencies at its maximum value, and means for sensing the changes in the period of said first and second periodic signals required to maintain said maximum value to obtain a measure of the distance from the transmitting means to said object.

2. The system in accordance with claim 1 wherein said first and second periodic signals have a square-wave form.

3. The system in accordance with claim 1 wherein said first and second periodic signals have a composite waveform consisting of the sum of a square-wave form and a sawtooth waveform.

4. In a frequency modulation distance measuring system, means for transmitting radio waves frequency modulated in accordance with a first square-wave signal of half-period T between a first frequency and a second frequency lower than said first frequency by an intermediate frequency, means for generating a local oscillator signal frequency modulated in accordance with a second square wave signal of the same period but opposite in phase to said first square-wave signal between said first frequency and a third frequency higher than said first frequency by said intermediate frequency, means adjacent to said transmitting means for receiving the transmitted waves after a delay by reflection from an object, means for mixing the received waves with said local oscillator signal to produce a resultant signal containing difference frequencies, an amplifier having a pass-band with a center frequency near said intermediate frequency for amplifying a selected one of said difference frequencies, means for varying the period of said first and second square wave signals to maintain the half-period T equal to said delay thereby to maintain said selected one of said difference frequencies at its maximum value, and means for sensing the changes in the period of said square-wave signals required to maintain said maximum value to obtain a measure of the distance from the transmitting means to said object.

5. The system in accordance with claim 4 further including means for adding a sawtooth waveform to each of said first and second square-wave signals to provide frequency modulation and local oscillator signals each having a composite waveform consisting of the sum of a square wave signal and a sawtooth signal.

6. In a frequency modulation distance measuring system, means for transmitting radio waves frequency modulated in accordance with a first square wave of half-period T between a first frequency and a second frequency different from an intermediate frequency, means for generating a local oscillator signal frequency modulated in accordance with a second square-wave of half-period T and opposite in polarity to said first square-wave signal between a third frequency and a fourth frequency differing by the difference between said first frequency and said second frequency, means adjacent to the transmitting means for receiving the transmitted waves after a delay by reflection from an object, means for mixing the received waves with said local oscillator signal to produce a resultant difference frequency signal centered about said intermediate frequency, an amplifier having a pass-band centered near said intermediate frequency for selectively amplifying only signals at said intermediate frequency or at frequencies different from said intermediate frequency by variations in the received signal due to the Doppler shift in transmission to said object and return, means for adjusting the half-period T of said first and second square-wave signals to equal said delay to maximize that portion of the output of said amplifying means which is due to Doppler shift, means for sensing when the output of said amplifying means is at its maximum value, and means for sensing the changes in the half-period of said square-wave signals required to maintain said maximum value to thereby obtain a measure of the distance from the transmitting means to said object.

7. The system in accordance with claim 4 further including means synchronized with said square-wave generating means for adding a sawtooth wave form to said square-wave signal to provide a composite frequency modulation signal consisting of the sum of a square wave frequency modulation signal and a sawtooth frequency modulation signal.

No references cited.